United States Patent
Uszkoreit et al.

(10) Patent No.: US 10,740,571 B1
(45) Date of Patent: Aug. 11, 2020

(54) GENERATING NEURAL NETWORK OUTPUTS USING INSERTION OPERATIONS

(71) Applicant: Google LLC, Mountain View, CA (US)

(72) Inventors: Jakob D. Uszkoreit, Portola Valley, CA (US); Mitchell Thomas Stern, Berkeley, CA (US); Jamie Ryan Kiros, Toronto (CA); William Chan, Markham (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/751,167

(22) Filed: Jan. 23, 2020

Related U.S. Application Data (60) Provisional application No. 62/796,038, filed on Jan. 23, 2019, provisional application No. 62/815,908, filed on Mar. 8, 2019.

(51) Int. Cl.
*G06F 40/44* (2020.01)
*G06N 3/08* (2006.01)
*G06N 3/04* (2006.01)
*G06N 5/04* (2006.01)

(52) U.S. Cl.
CPC .......... *G06F 40/44* (2020.01); *G06N 3/0445* (2013.01); *G06N 3/08* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 9,524,716 B2* | 12/2016 | Sethy | G10L 15/16 |
| 2012/0245919 A1* | 9/2012 | Aradilla | G10L 15/187 704/2 |
| 2016/0180215 A1* | 6/2016 | Vinyals | G06F 40/205 706/20 |
| 2017/0323636 A1* | 11/2017 | Xiao | G06F 40/289 |
| 2018/0203852 A1* | 7/2018 | Goyal | G06N 3/006 |
| 2019/0043379 A1* | 2/2019 | Yuan | G09B 7/02 |
| 2019/0182516 A1* | 6/2019 | Li | H04N 21/23424 |
| 2019/0272318 A1* | 9/2019 | Suzuki | G06F 40/49 |
| 2019/0287012 A1* | 9/2019 | Celikyilmaz | G06F 16/345 |
| 2020/0034435 A1* | 1/2020 | Norouzi | G06F 40/58 |

OTHER PUBLICATIONS

Bandanau et al., "End-to-End Attention-based Large Vocabulary Speech Recognition," 2016 IEEE International Conference on Acoustics, Speech and Signal Processing (ICASSP), Mar. 2016, 4945-4949.

Bandanau et al., "Neural Machine Translation by Jointly Learning to Align and Translate," https://arxiv.org/abs/1409.0473v6, Apr. 2015, 15 pages.

Chan et al., "Listen, Attend and Spell: A Neural Network for Large Vocabulary Conversational Speech Recognition," 2016 IEEE International Conference on Acoustics, Speech and Signal Processing (ICASSP), Mar. 2016, 4960-4964.

(Continued)

*Primary Examiner* — Neeraj Sharma
(74) *Attorney, Agent, or Firm* — Fish & Richardson P.C.

(57) ABSTRACT

Methods, systems, and apparatus, including computer programs encoded on computer storage media, for generating network outputs using insertion operations.

20 Claims, 4 Drawing Sheets

(56) References Cited

OTHER PUBLICATIONS

Cho et al., "Learning Phrase Representations using RNN Encoder-Decoder for Statistical Machine Translation," Proceedings of the 2014 Conference on Empirical Methods in Natural Language Processing (EMNLP), Oct. 2014, 1724-1734.
Ford et al., "The Importance of Generation Order in Language Modeling," https://arxiv.org/abs/1808.07910, Aug. 2018, 6 pages.
Graves, "Sequence Transduction with Recurrent Neural Networks," https://arxiv.org/abs/1211.3711, Nov. 2012, 9 pages.
Gu et al., "Insertion-based Decoding with Automatically Inferred Generation Order," https://arxiv.org/abs/1902.01370, last revised Oct. 2019, 15 pages.
Gu et al., "Non-Autoregressive Neural Machine Translation," https://arxiv.org/abs/1711.02281, last revised Mar. 2018, 13 pages.
Hinton et al., "Distilling the Knowledge in a Neural Network," https://arxiv.org/abs/1503.02531, Mar. 2015, 9 pages.
Kim et al., "Sequence-Level Knowledge Distillation," Proceedings of the 2016 Conference on Empirical Methods in Natural Language Processing, Nov. 2016, 1317-1327.
Lee et al., "Deterministic Non-Autoregressive Neural Sequence Modeling by Iterative Refinement," Proceedings of the 2018 Conference on Empirical Methods in Natural Language Processing, Oct. 2018, 1173-1182.
Luong et al., "Effective Approaches to Attention-based Neural Machine Translation," Proceedings of the 2015 Conference on Empirical Methods in Natural Language Processing, Sep. 2015, 1412-1421.
Menick et al., "Generating High Fidelity Images with Subscale Pixel Networks and Multidimensional Upscaling," retrieved from URL <https://openreview.net/pdf?id=HylzTiC5Km>, 2019, 15 pages.
Norouzi et al., "Reward Augmented Maximum Likelihood for Neural Structured Prediction," https://arxiv.org/abs/1609.00150v2, Sep. 2016, 11 pages.
PCT Application No. PCT/US2018/034224, Attention-Based Sequence Transduction Neural Networks, filed May 23, 2018, 32 pages.
Post, "A Call for Clarity in Reporting BLEU Scores," https://arxiv.org/abs/1804.08771, last revised Sep. 2018, 6 pages.
Reed et al., "Parallel Multiscale Autoregressive Density Estimation," Proceedings of the 34th International Conference on Machine Learning, Aug. 2017, 10 pages.
Rusu et al., "Policy Distillation," https://arxiv.org/abs/1511.06295, last revised Jan. 2016, 13 pages.
Shah et al., "Generating Sentences Using a Dynamic Canvas," The Thirty-Second AAAI Conference on Artificial Intelligence, Apr. 2018, 5430-5437.
Stern et al., "Blockwise Parallel Decoding for Deep Autoregressive Models," Proceedings of the 32nd International Conference on Neural Information Processing Systems, Dec. 2018, 10 pages.
Stern et al., "Insertion Transformer: Flexible Sequence Generation via Insertion Operations," https://arxiv.org/abs/1902.03249, Feb. 2019, 10 pages.
Sutskever et al., "Sequence to Sequence Learning with Neural Networks," https://arxiv.org/abs/1409.3215, last revised Dec. 2014, 9 pages.
Van den Oord et al., "Conditional Image Generation with PixelCNN Decoders," Proceedings of the 30th International Conference on Neural Information Processing Systems, Dec. 2016, 9 pages.
Van den Oord et al., "Pixel Recurrent Neural Networks," https://arxiv.org/abs/1601.06759, last revised Aug. 2016, 11 pages.
Van den Oord et al., "WaveNet: A Generative Model for Raw Audio," https://arxiv.org/abs/1609.03499, Sep. 2016, 15 pages.
Vaswani et al., "Attention Is All You Need," https://arxiv.org/abs/1706.03762v5, last revised Dec. 2017, 15 pages.
Vaswani et al., "Tensor2Tensor for Neural Machine Translation," https://arxiv.org/abs/1803.07416, Mar. 2018, 9 pages.
Vinyals et al., "Order Matters: Sequence to sequence for sets," https://arxiv.org/abs/1511.06391v1, Nov. 2015, 10 pages.
Vinyals et al., "Show and Tell: A Neural Image Caption Generator," 2015 IEEE Conference on Computer Vision and Pattern Recognition (CVPR), Jun. 2015, 3156-3164.
Wang et al., "Semi-Autoregressive Neural Machine Translation," Proceedings of the 2018 Conference on Empirical Methods in Natural Language Processing, Oct. 2018, 479-488.
Wang et al., "Tacotron: Towards End-to-End Speech Synthesis," INTERSPEECH 2017, Aug. 2017, 4006-4010.
Welleck et al., "Non-Monotonic Sequential Text Generation," https://arxiv.org/abs/1902.02192, last revised Oct. 2019, 21 pages.
Xu et al., "Show, Attend and Tell: Neural Image Caption Generation with Visual Attention," https://arxiv.org/abs/1502.03044v2, Feb. 2015, 22 pages.
Yang et al., "Breaking the Softmax Bottleneck: A High-Rank RNN Language Model," https://arxiv.org/abs/1711.03953, last revised Mar. 2018, 18 pages.
Libovicky et al, "End-to-End Non-Autoregressive Neural Machine Translation with Connectionist Temporal Classification" Proceedings of the 2018 Conference on Empirical Methods in Natural Language Processing, 2018, 6 pages.
PCT International Search Report and Written Opinion in International Application No. PCT/US2020014842, dated May 19, 2020, 19 pages.
Soltau et al, "Neural Speech Recognizer Acoustic-to-Word LSTM Model for Large Vocabulary Speech Recognition" Interspeech 2017, 2017, 6 pages.

\* cited by examiner

GENERATING NEURAL NETWORK OUTPUTS USING INSERTION OPERATIONS

CROSS-REFERENCE TO RELATED APPLICATIONS

This application claims priority to U.S. Provisional Application No. 62/796,038, filed on Jan. 23, 2019, and U.S. Provisional Application No. 62/815,908, filed on Mar. 8, 2019. The disclosures of the prior applications are considered part of and are incorporated by reference in the disclosure of this application.

BACKGROUND

This specification relates to generating outputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates a network output that includes a respective output from a vocabulary of outputs at each of multiple locations in an output order. In some cases, the output is a one-dimensional sequence, e.g., a sequence of text, while in other cases the output is a higher-dimensional array, e.g., an image.

Particular embodiments of the subject matter described in this specification can be implemented so as to realize one or more of the following advantages.

Auto-regressive models have been shown to achieve high-quality of performance on a variety of output generation tasks, e.g., speech recognition, machine translation, image generation, and so on. However, auto-regressive models require a new output to be added to the end of the current input sequence at each of multiple time steps. The described techniques, on the other hand, allow for new outputs to be added at arbitrary positions within the current input sequence and, in some cases, multiple outputs to be added at multiple different positions at a single time step.

When only a single output is added at each time step, the additional flexibility afforded to the neural network to select the position at which the single output is added improves performance over conventional auto-regressive models without increasing the number of generation time steps required.

When multiple outputs can be added at each time step, because the number of generation time steps for which processing is required to be performed is reduced, the described techniques allow for outputs to be generated much quicker (and while using fewer computational resources) than outputs generated by auto-regressive models without a significant decrease (and, in some cases, with an increase) in output generation quality. In other words, by generating multiple different outputs in parallel at the same time step, the system can generate the output over fewer generation time steps and use fewer computational resources than conventional systems while still generating network outputs that are comparable in quality to these conventional systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates a network output that includes a respective output from a vocabulary of outputs at each of multiple locations in an output order. In some cases, the output is a one-dimensional sequence, e.g., a sequence of text, while in other cases the output is a higher-dimensional array, e.g., an image. The vocabulary of outputs can include each possible output that can be selected when performing a machine learning task to generate a network output.

For example, the system may be a neural machine translation system. That is, if the network input is a sequence of words in an original language, e.g., a sentence or phrase, the network output may be a translation of the network input into a target language, i.e., a sequence of words in the target language that represents the sequence of words in the original language.

As another example, the system may be a speech recognition system. That is, if the network input is a sequence of audio data representing a spoken utterance, the network output may be a sequence of graphemes, characters, or words that represents the utterance, i.e., is a transcription of the network input.

As another example, the system may be a natural language processing system. For example, if the network input is a sequence of words in an original language, e.g., a sentence or phrase, the network output may be a summary of the network input in the original language, i.e., a sequence that has fewer words than the network input but that retains the essential meaning of the network input. As another example, if the network input is a sequence of words that form a question, the network output can be a sequence of words that form an answer to the question.

As another example, the system may be part of a computer-assisted medical diagnosis system. For example, the network input can be a sequence of data from an electronic medical record and the network output can be a sequence of predicted treatments.

As another example, the system may be part of an image processing system. For example, the network input can be an image, i.e., a sequence of color values from the image, and the output can be a sequence of text that describes the image. As another example, the network input can describe the context of an image, .e.g., be a sequence of text, and the network output can be an image that describes the context.

Figure 1:
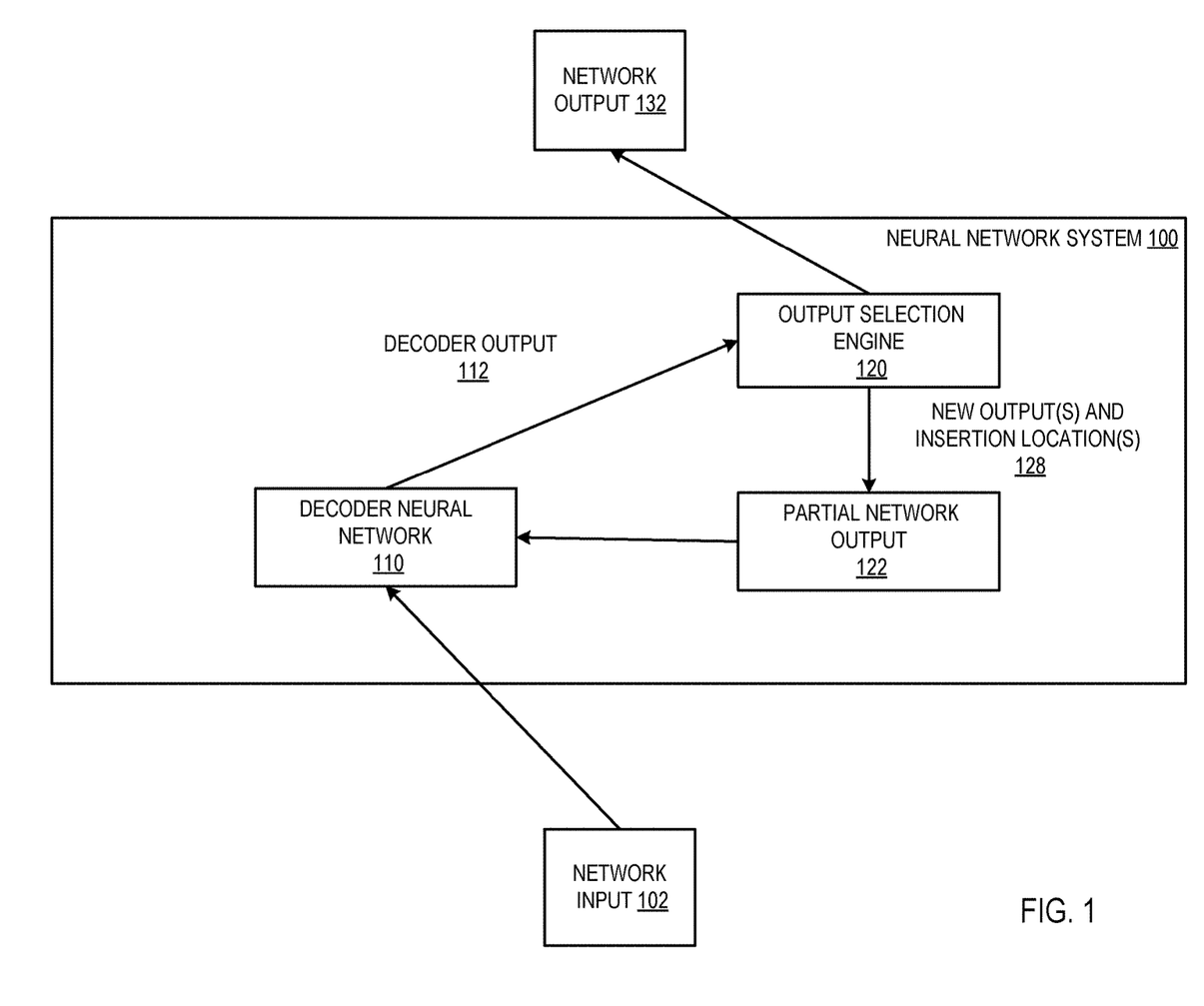
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

The system 100 receives a network input 102 processes the network input 102 to generate a network output 132 for the network input 102.

In particular, the system 100 generates the network output 132 over multiple generation time steps.

At each generation time step, the system 100 selects one or more new outputs 128 from the vocabulary to be added to the network output conditioned on the network input 102 and a current partial network output 122 that has already been generated as of the generation time step.

As of any given generation time step, the current partial network output 122 has zero or more outputs from the vocabulary of outputs arranged according to a partial output order. In other words, at the first generation time step, the current partial network output 122 is empty, i.e., has zero outputs, and, at all other generation time steps, the current partial network output 122 has the outputs that were previously added at previous generation time steps.

In more detail, at each generation time step, the system 100 identifies the current partial network output 122 that has already been generated as of the generation time step.

The system 100 then performs one or more insertion operations to add one or more new outputs 128 to the current partial network output 122.

In particular, the system 100 generates, using a decoder neural network 110 conditioned on (i) at least a portion of the network input 102 and (ii) the outputs in the current partial network output 122, a decoder output 112.

The decoder output 112 defines, for each of a plurality of insertion locations, a respective score distribution over the vocabulary of outputs.

Each insertion location is a different new location in the partial output order at which there is no output in the current partial network output, i.e., a new location that can be added to the partial output order (i) before all of the outputs in the current partial network output, (ii) between two outputs in the current partial network output, or (iii) after all of the outputs in the current partial network output.

For the first generation time step, there may only be a single insertion location that adds the first output to the current partial network output 122, i.e., because for the first generation time step the current partial network output 122 is empty and there are no outputs already in the current partial network output 122.

An output selection engine 120 within the system 100 then selects, using the decoder output 112, one or more of the insertion locations and, for each selected insertion location, an inserted output from the vocabulary, i.e., selects one or more new outputs 128 and one or more insertion locations 128.

The system 100 then updates the current partial network output 122 by generating a new partial network output that includes (i) any outputs in the current partial network output 122 and (ii) for each selected insertion location, the inserted output from the vocabulary inserted at the corresponding new location in the partial output order.

In some implementations (referred to as "greedy decoding"), the engine 120 selects only a single insertion location, i.e., adds a single output to the current output, at each generation time step. In these implementations, because the engine 120 selects the insertion location at which the single output will be added rather than automatically adding the single output to the end of the current output 122 as would be done by conventional systems, the quality of the final output can be increased relative to conventional systems, i.e., because the network output can be generated according to a more flexible ordering when adding outputs to the end of the current outputs 122 is insufficient or suboptimal.

In some other implementations (referred to as "parallel decoding"), the engine 120 can select multiple insertion locations, i.e., add multiple outputs to the current partial output 122, at any given generation time step. In these implementations, because, unlike in conventional systems, multiple outputs can be added at a single generation time step, the number of time steps required to generate the network output 132 and, therefore, the time and amount of computational resources required to generate the network output 132, can be greatly reduced.

Selecting insertion locations and outputs using both greedy decoding and parallel decoding is described in more detail below with reference to FIG. 3.

The system 100 can continue adding outputs at generation time steps until termination criteria have been reached, i.e., until certain criteria involving an end-of-sequence token that is in the vocabulary are satisfied, as described in more detail below with reference to FIG. 3.

That is, at each generation time step, the system 100 checks, using the decoder output 112, to see if the criteria are satisfied and only adds a new output 128 to the current partial output 122 if the criteria are not satisfied.

If the criteria are satisfied, the system 100 determines that the current partial output 122 is the final output to be generated, does not add any more outputs to the current partial output 122, and outputs the current partial output 122 as the final network output 132. In some cases, the decoder neural network 110 is an attention-based decoder neural network that applies attention over encoded representations of the network input, i.e., generated by an encoder neural network (which can be part of the system 100 or an external system that encodes the network input 102 before the network input is provided to the system 100), and self-attention over the outputs in the current partial output 122. Such a neural network is described in PCT Application No. PCT/US2018/034224, filed on May 23, 2018, the entire contents of which are hereby incorporated by reference herein in their entirety. Some attention-based decoders apply causal masked self-attention over the outputs in the current partial output to prevent outputs at any given position from being influenced by outputs at future positions. Because the system 100 is able to insert an output at any insertion location, unlike these other attention-based decoders, the decoder neural network 110 does not apply a causal self-attention mask from the decoder so that all positions can attend to all other positions, as opposed to just those to the left of the current position. This allows each decision to condition on the full context of the current partial output at any given generation time step. Other modifications to such neural networks that may improve the performance of the neural network when generating insertion operations are described below with reference to FIG. 4.

In other cases however, the decoder neural network 110 is a different type of neural network that maps network inputs to network outputs.

For example, the decoder 110 can be a recurrent neural network that is conditioned on the current partial output 122 through a recurrent state and that applies attention over encoded representations of the network input generated by an encoder neural network.

As another example, the decoder 110 can be a convolutional neural network that receives as input the current partial output and has one or more convolutional neural network layers that are conditioned on a representation of the network input.

Figure 2:
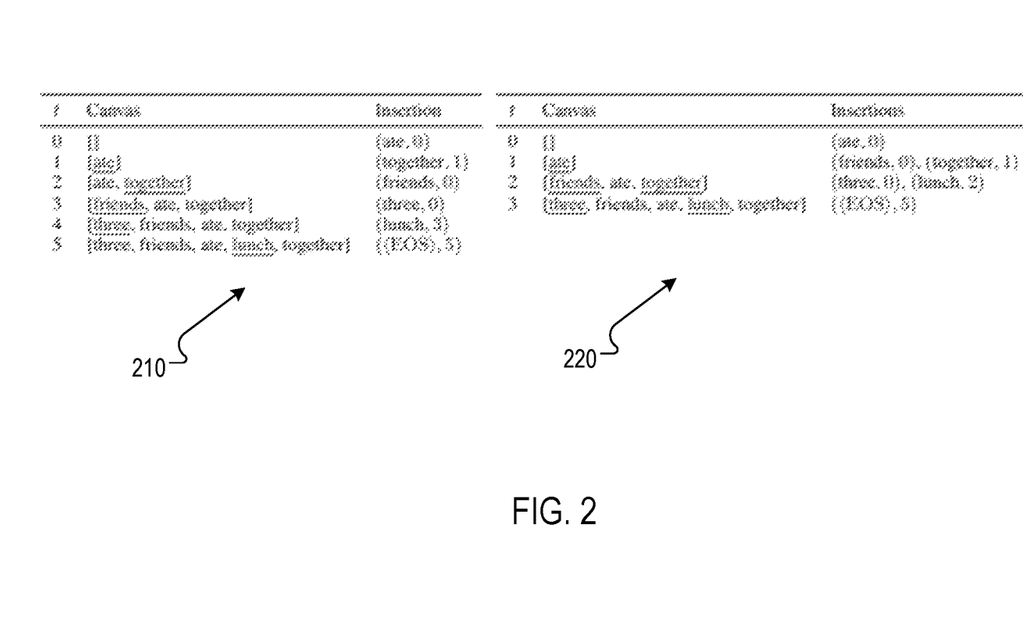
FIG. 2 illustrates the generation of an example network output using the neural network system.

FIG. 2 shows the generation of an example network output using the neural network system 100. In the example of FIG. 2, the network output that is being generated is [three, friends, ate, lunch, together], where each of the words in the output is selected from a vocabulary of words.

Segment 210 of FIG. 2 illustrates the generation of the network output using "greedy" decoding over six time steps 0-5 shown in in column "t". The current partial output as of any one of the six time steps is shown in the column labelled "Canvas" while the insertion operation performed at the time step is shown column "Insertion." Thus, as can been from segment 210, in greedy decoding the system adds a single output to the current partial output at each time step. However, unlike in conventional systems, for example, at time step 2, the word "friends" is added at location 0, i.e., to the front of the partial output [ate, together]. Segment 220 of FIG. 2 illustrates the generation of the network output using "parallel decoding" over four time steps 0-4. As can been from segment 220, in parallel decoding the system can add multiple outputs to the current partial output at a given time step. For example, at time step 1, "friends" is added at insertion location 0, to the front of the current partial output, while "together" is added to insertion location 1. As another example, at time step 2, "three" is added at insertion location 0, while "lunch" is added to insertion location 2, i.e., between the words "ate" and "together."

Figure 3:
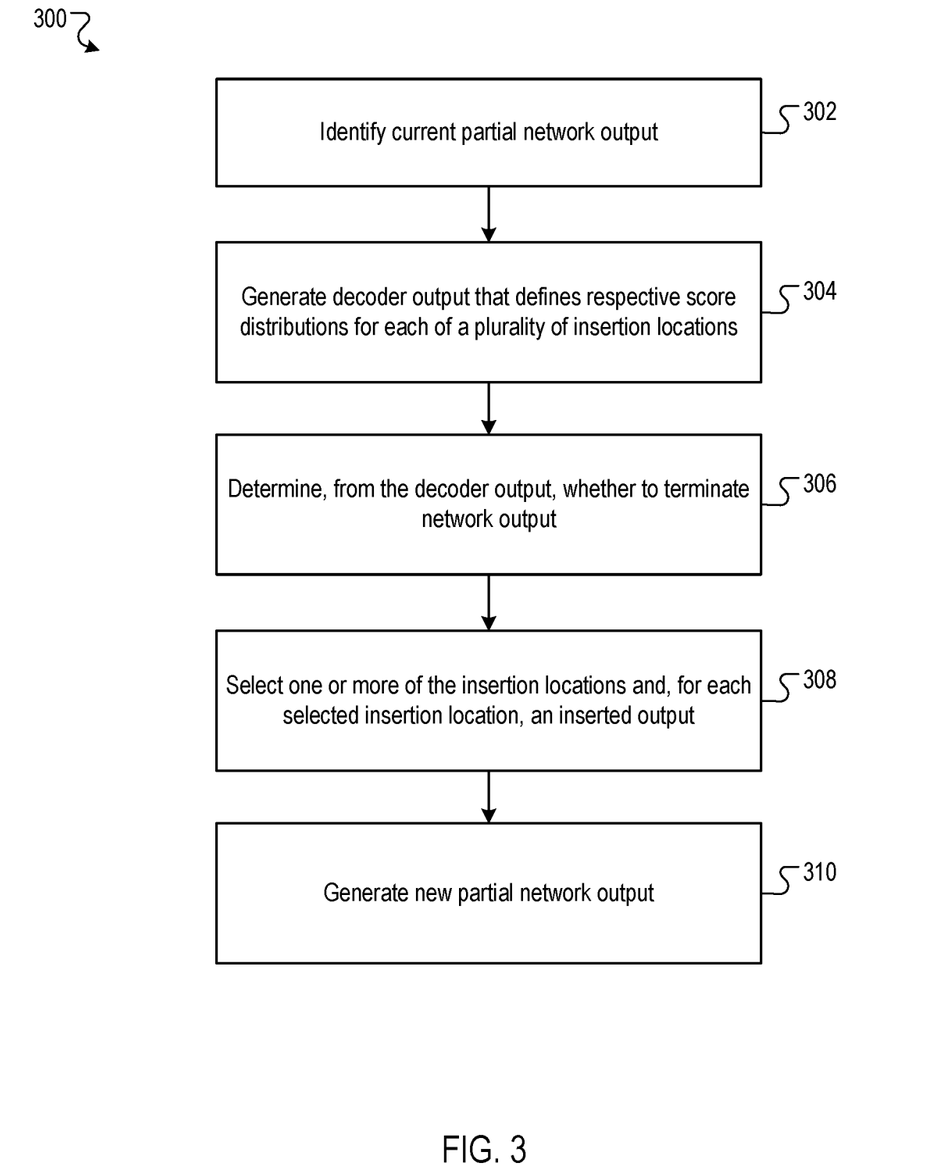
FIG. 3 is a flow diagram of an example process for generating a network output.

FIG. 3 is a flow diagram of an example process 300 for generating a network output from a network input. For convenience, the process 300 will be described as being performed by a system of one or more computers located in one or more locations. For example, a neural network system, e.g., the neural network system 100 of FIG. 1, appropriately programmed, can perform the process 300.

The system can perform the process 300 at each of multiple generation time steps to generate the network output from the network input. In particular, the system continues performing process 300 until termination criteria are satisfied at step 306.

The system identifies the current partial network output that has already been generated as of the generation time step (step 302).

The current partial network output has zero or more outputs from the vocabulary of outputs arranged according to a partial output order. In other words, at the first generation time step, the partial output is empty, i.e., has zero outputs, and, at all other generation time steps, the partial output has the outputs that were previously added at previous generation time steps.

The system generates, using the decoder neural network and conditioned on (i) at least a portion of the network input and (ii) any outputs that are in the current partial network output, a decoder output (step 304).

The decoder output defines, for each of a plurality of insertion locations, a respective score distribution over the vocabulary of outputs. Each insertion location is a different new location in the partial output order at which there is no output in the current partial network. For example, at the first time step, there is only a single new location in the partial output order, i.e., the location at which the first output can be added to the network output. At the other generation time steps, the new locations include (i) the location before any of the outputs in the current partial network output, (ii) the location after all of the outputs in the current partial network output, and (iii) if there is more than one network output in the current partial network output, the respective locations between each consecutive pair of network outputs in the current partial network outputs. As a particular example, if the current partial network output is [friends, ate, together], the partial network output with the new locations (denoted by "_") at which a new output could be inserted shown would be [_, friends, _, ate, _, together,].

Generating the decoder output is described in more detail below with reference to FIG. 4.

The system then determines, based on the decoder output, whether the network output should be terminated (step 306) and, if not, selects, using the decoder output, one or more of the insertion locations and, for each selected insertion location, an inserted output from the vocabulary (step 308).

That is, if system determines that the network output should be terminated, the system uses the current partial output as the final network output. If the system determines that the network output should not be terminated, the system selects one or more outputs to be added to the current partial output.

The manner in which the system determines whether the network output should be terminated and, if not, the manner in which the system selects the insertion locations depends on whether the system is configured to perform greedy decoding or parallel decoding.

As described above, in greedy decoding the system selects only a single insertion location, i.e., adds a single output to the current output, at each generation time step.

In some of the implementations in which the system performs greedy decoding, the system can determine to terminate the network output when the insertion location-output combination with the highest score across all insertion location-output combinations includes, as the output in the combination, an end-of-sequence token. Generally, the end-of-sequence token is a predetermined token that is added to the vocabulary but will never be produced as part of a network output and will only be used by the system to determine when to terminate the network output. The score for a given insertion location-given output combination refers to the score for the given output in the score distribution for the given insertion location as defined by the decoder output.

In these implementations, when the system determines that the insertion location-output combination with the highest score across all insertion location-output combinations does not include the end-of-sequence token, the system selects only the insertion location-output combination with the highest score across all insertion location-output combinations.

In other words, the system selects, as the insertion location, the insertion location in the insertion location-output combination with the highest score across all insertion location-output combinations and selects, as the inserted output for the selected insertion location, the output from the insertion location-output combination with the highest score across all insertion location-output combinations.

In others of the implementations in which the system performs greedy decoding, the system can determine to terminate the network output only when, for all of the insertion locations, the output with the highest score is the end-of-sequence token insertion.

In other words, the system determines not to terminate the network output whenever there is at least one insertion location for which the output with the highest score is not the end-of-sequence token.

In these implementations, in response to determining not to terminate, the system selects only the insertion location-output combination with the highest score across all insertion location-output combinations.

As described above, in parallel decoding the system can select multiple insertion locations, i.e., add multiple outputs to the current partial output, at any given generation time step.

When performing parallel decoding, the system identifies, from the decoder output and for each insertion location, an output that has a highest score in the score distribution for the insertion location. The system then determines to terminate the network output only when the end-of sequence-token is the output with the highest score in the score distributions for all of the insertion locations.

In other words, the system determines not to terminate when there is at least one insertion location for which the output with the highest score is not the end-of-sequence token.

In response to determining not to terminate, the system selects each insertion location for which the output with the highest score is not the end-of-sequence token. For each selected location, the system then selects the corresponding output that has the highest score for the selected insertion location. Thus, when there are multiple insertion locations for which the output that has the highest score is an output other than the end-of-sequence token, the system selects multiple insertion locations at the generation time step.

The system then generates a new partial network output that includes (i) any outputs in the current partial network output and (ii) for each selected insertion location, the inserted output from the vocabulary inserted at the corresponding new location in the partial output order (step 310).

Figure 4:
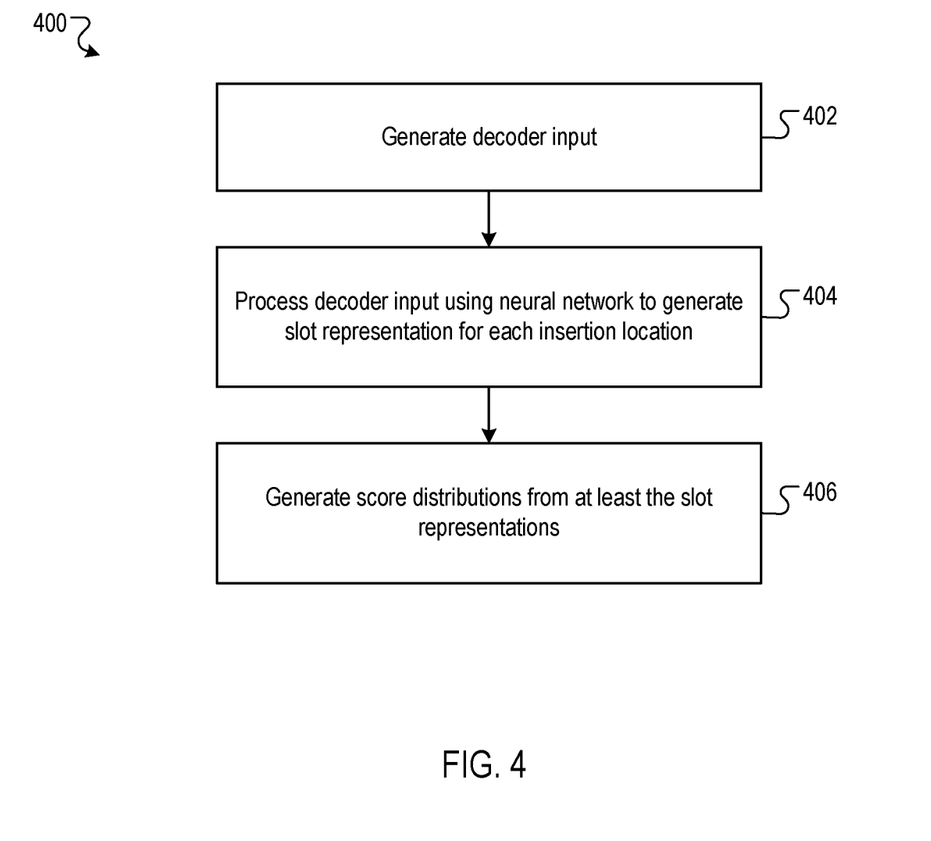
FIG. 4 is a flow diagram of an example process for generating score distributions.

FIG. 4 is a flow diagram of an example process 400 for generating a decoder output. For convenience, the process 400 will be described as being performed by a system of one or more computers located in one or more locations. For example, a neural network system, e.g., the neural network system 100 of FIG. 1, appropriately programmed, can perform the process 400.

The system generates a decoder input for the generation time step (step 402). As described above, the decoder input conditions the neural network on the current partial network output as of the time step and on the network input.

In particular, as described above, in some implementations the decoder neural network is a self-attention decoder neural network or an auto-regressive convolutional decoder neural network that receives a decoder input that includes the outputs in the current partial network output arranged according to the partial output order and encoded representations of the network input.

In these implementations, the system can, as part of generating the decoder input, augment the current partial network output by adding two marker outputs to the current partial network output in pre-determined positions in the partial output order, e.g., before the first output in the partial output order and after the last output in the partial output order. A marker output is a pre-determined output that is never emitted as part of a network output and is only used to augment the partial network output.

The system processes the decoder input using the neural network generate a respective slot representation for each insertion location (step 404).

In particular, at each time step, both self-attention decoders and auto-regressive convolutional decoders are configured to generate a respective representation vector for each output in the current partial output as of the time step.

Because the current partial output has been augmented with the marker outputs, when the current partial output includes N outputs, the decoder neural network generates N+2 representations: one for each of the N outputs and one for each of the marker outputs.

Moreover, when there are N outputs, there are N+1 possible insertion locations: (i) one location before any of the outputs in the current partial network output, (ii) one location after all of the outputs in the current partial network output, and (iii) if there is more than one network output in the current partial network output, the N−1 respective locations between each consecutive pair of network outputs in the current partial network outputs.

To generate the slot representations for the N+1 insertion locations, for each insertion location, the system generates the respective slot representation for the insertion location by concatenating the representation vectors for each adjacent pair of locations in the partial output order. For example, to generate the respective slot representation for the insertion location between the second and third output in the partial output order, the system would concatenate the representation vectors for the second and third outputs. The system generates the score distributions from at least the slot representations (step 406).

The system can generate the score distribution from the slot representations in any of a variety of ways.

As one example, the system can project a decoder hidden state matrix generated from the slot representations, i.e., a matrix that has the slot representations as either the rows or the columns of the matrix, using a projection matrix to generate a content-location logit matrix. This projection matrix can be learned during the training of the decoder neural network. The system can then flatten the content-location logit matrix into a content-location logit vector and apply a softmax over the content-location logit vector to generate a probability distribution over all insertion location-output combinations.

As another example, the system can generate a respective probability for each insertion location by applying a softmax to the product of the decoder hidden state matrix and a learned query vector, i.e., a learned query vector that, when applied to the decoder hidden state matrix, maps the hidden state matrix to a vector that includes a respective value for each insertion location.

For each insertion location, the system can then project the slot representation for the location into a score vector that includes a respective score for each output in the vocabulary using a projection matrix (that is also learned during the training of the decoder) and apply a softmax over the score vector to generate an initial probability for each output in the vocabulary.

To generate the score distribution for each insertion location, the system then multiplies each initial probability by the probability for the location to generate a final probability for each output in the vocabulary.

In either of these examples, the system can optionally also incorporate a bias vector to increase information sharing across insertion locations. In particular, the system can generate a context vector by applying max pooling over the slot representations and then generate the bias vector from the context vector, where the bias vector is a vector that includes a respective bias value for each output in the vocabulary.

The system can then generate the decoder output from the bias vector and the slot representations. For example, prior to computing a softmax over any set of logits, the system can add the bias vector to the logits. Generally, incorporating this bias vector may be useful in providing the decoder neural network with coverage information, or in propagating count information about common outputs that should appear in multiple places in the network output.

In order for the system to be effectively used to generate network outputs, i.e., to generate high-quality decoder outputs that the system can use to generate high-quality network outputs, the system trains the neural network on training data to optimize an objective function.

One example of an objective function that can be used to train the neural network is one that uses a soft order reward framework in order to train the decoder neural network to follow an "oracle" policy when generating network outputs. In particular, for any given insertion operation a at a given generation time step that inserts an output w into an insertion location s in between position i and position j in the output order, the system can compute a reward value that is equal to the negative of an order function mapping actions to real numbers, with lower values corresponding to better actions.

The system can then minimize a loss that depends on a KL divergence between (i) an oracle policy for the generation time step that is based on the reward values and (ii) the score distributions generated by the decoder neural network at the given generation time step.

In particular, the system can train the neural network to minimize the following loss using conventional gradient-based neural network training techniques:

$$R(a) = \begin{cases} -O(a) & \forall a \in A^* \\ -\infty & \forall a \notin A^* \end{cases}$$

$$q_{oracle}(a) = \frac{\exp(R(a)/\tau)}{\sum_{a' \in A^*} \exp(R(a')/\tau)}$$

$$\mathcal{L} = KL(q_{oracle} \| p)$$

where $A^*$ is the set of valid actions at the given generation time step, p are the score distributions generated by the neural network, $\tau$ is a constant temperature parameter, and O(a) is the order function. An action is a valid action at a given generation time step if it results in an output from the actual network output being inserted into the partial output at one of the insertion locations available at the generation time step. By using a different order function, the system can train the neural network to generate network outputs according to a variety of different orderings. Some examples of order functions that can be used are shown in Table 1 below.

TABLE 1

| Order Function O(a) |
| --- |
| 0 |
| \|s − (i + j )/2\| |
| rank(hash(w)) |
| ±s |
| ±rank(frequency(w)) |
| ±rank(length(w)) |
| ±rank(w) |
| ±logp(a) |

As another example, the system can train the neural network to minimize a loss function that specifically encourages the neural network to produce its output in a left-to-right fashion. In this example, the loss function can be of the form:

$$\text{loss}(x,\hat{y}) = -\log p(y_{k+1}, k | x, \hat{y}).$$

where k is a randomly sampled position in the actual network output y for the network input x, $\hat{y}$ is the prefix that includes the first k outputs of the actual network output, and p is the score assigned to a given output, insertion location pair by the neural network.

As yet another example, the system can train the neural network for maximal parallelism to encourage a balanced binary tree ordering in generating the network output. In this example, the loss function can be of the form:

$$\text{slot-loss}(x, \hat{y}, l) = \sum_{i=i_l}^{j_l} -\log p(y_i, l | x, \hat{y}) \cdot w_l(i).$$

$$\text{loss}(x, \hat{y}) = \frac{1}{k+1} \sum_{l=0}^{k} \text{slot-loss}(x, \hat{y}, l),$$

where $w_l(i)$ is a weight for insertion location i for a position l in the network output that is based on the distance of the insertion location i from the center of the span of outputs from the target output yet to be produced at position l.

As yet another example, the system can train the neural network to assign equal probability mass to each correct action with no preference for which positions in the network output are generated first. In this example, the loss function can be of the form:

$$\text{slot-loss}(x, \hat{y}, l) = \frac{1}{j_l - i_l + 1} \sum_{i=i_l}^{j_l} -\log p(y_i, l | x, \hat{y}).$$

$$\text{loss}(x, \hat{y}) = \frac{1}{k+1} \sum_{l=0}^{k} \text{slot-loss}(x, \hat{y}, l),$$

where $i_l$ is the first output that is yet to be produced at position l and $j_l$ is the last output yet to be produced at position l.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a network input; and
   generating a network output from the network input, wherein the network output comprises a plurality of outputs from a vocabulary of outputs arranged according to an output order, the generating comprising, at each of a plurality of generation time steps:
   identifying a current partial network output that has already been generated as of the generation time step, the current partial network output comprising zero or more outputs from the vocabulary of outputs arranged according to a partial output order;
   generating, using a decoder neural network conditioned on (i) at least a portion of the network input and (ii) any outputs in the current partial network output, a decoder output that defines, for each of a plurality of insertion locations, a respective score distribution over the vocabulary of outputs, wherein each insertion location is a different new location in the partial output order at which there is no output in the current partial network output, wherein the decoder neural network is an attention-based neural network that is configured to generate the decoder output by applying an attention mechanism over an encoded representation of the network input and a self-attention mechanism over the outputs in the current partial network output;
   selecting, using the decoder output, one or more of the insertion locations and, for each selected insertion location, an inserted output from the vocabulary; and
   generating a new partial network output that comprises (i) the zero or more outputs in the current partial network output and (ii) for each selected insertion location, the inserted output from the vocabulary inserted at the corresponding new location in the partial output order.

2. The method of claim 1, wherein generating the decoder output using the decoder neural network comprises:
   generating a decoder input that includes the encoded representation of the network input and the outputs in the current partial network output arranged according to the partial output order.

3. The method of claim 2,
   wherein generating the decoder input further comprises adding two marker outputs to the current partial network output,
   wherein the decoder neural network is configured to generate a respective representation vector for each location in the partial output order after the two marker outputs have been added, and
   wherein generating the decoder output comprises:
   generating a respective slot representation for each insertion location by concatenating the representation vectors for each adjacent pair of locations in the partial output order; and
   generating a score distribution for each insertion location from at least the slot representation for the insertion location.

4. The method of claim 1, wherein the vocabulary includes an end-of-sequence token.

5. The method of claim 4, wherein selecting, using the decoder output, one or more of the insertion locations and, for each selected insertion location, an inserted output from the vocabulary comprises:
   determining that an insertion location-output combination with a highest score across all insertion location-output combinations does not include the end-of-sequence token; and
   in response, selecting only the insertion location-output combination with a highest score across all insertion location-output combinations.

6. The method of claim 4, wherein selecting, using the decoder output, one or more of the insertion locations and, for each selected insertion location, an inserted output from the vocabulary comprises:

determining that there is at least one insertion location for which the output with the highest score is not the end-of-sequence token; and in response, selecting only an insertion location-output combination with a highest score across all insertion location-output combinations that include an insertion location for which the output with the highest score is not the end-of-sequence token.

7. The method of claim 4, wherein selecting, using the decoder output, one or more of the insertion locations and, for each selected insertion location, an inserted output from the vocabulary comprises:

identifying, from the decoder output and for each insertion location, an output that has a highest score for the insertion location;

determining that there is at least one insertion location for which the output with the highest score is not the end-of-sequence token; and in response, selecting each insertion location for which the output with the highest score is not the end-of-sequence token and the corresponding output that has the highest score for the insertion location.

8. The method of claim 1, wherein the decoder neural network is configured to generate a respective slot representation for each insertion location.

9. The method of claim 8, wherein generating the decoder output comprises:

projecting a decoder hidden state matrix generated from the slot representations using a projection matrix to generate a content-location logit matrix;

flattening the content-location logit matrix into a content-location logit vector; and applying a softmax over the content-location logit vector to generate a probability distribution over all insertion location-output combinations.

10. The method of claim 8, wherein generating the decoder output comprises:

generating a respective probability for each location by applying a softmax to a product of a decoder hidden state matrix generated from the slot representations and a learned query vector;

for each location:

projecting the slot representation for the location into a score vector that includes a respective score for each output in the vocabulary using a projection matrix;

applying a softmax over the score vector to generate an initial probability for each output in the vocabulary; and multiplying each initial probability by the probability for the location to generate a final probability for each output in the vocabulary.

11. The method of claim 8, wherein generating the decoder output comprises:

generating a context vector by applying max pooling over the slot representations;

generating a bias vector from the context vector that includes a respective bias value for each output in the vocabulary; and generating the decoder output from the bias vector and the slot representations.

12. One or more non-transitory computer-readable storage media storing instructions that when executed by one or more computers cause the one or more computers to perform operations comprising:

receiving a network input; and generating a network output from the network input, wherein the network output comprises a plurality of outputs from a vocabulary of outputs arranged according to an output order, the generating comprising, at each of a plurality of generation time steps:

identifying a current partial network output that has already been generated as of the generation time step, the current partial network output comprising zero or more outputs from the vocabulary of outputs arranged according to a partial output order;

generating, using a decoder neural network conditioned on (i) at least a portion of the network input and (ii) any outputs in the current partial network output, a decoder output that defines, for each of a plurality of insertion locations, a respective score distribution over the vocabulary of outputs, wherein each insertion location is a different new location in the partial output order at which there is no output in the current partial network output, wherein the decoder neural network is an attention-based neural network that is configured to generate the decoder output by applying an attention mechanism over an encoded representation of the network input and a self-attention mechanism over the outputs in the current partial network output;

selecting, using the decoder output, one or more of the insertion locations and, for each selected insertion location, an inserted output from the vocabulary; and generating a new partial network output that comprises (i) the zero or more outputs in the current partial network output and (ii) for each selected insertion location, the inserted output from the vocabulary inserted at the corresponding new location in the partial output order.

13. A system comprising one or more computers and one or more storage devices storing instructions that when executed by one or more computers cause the one or more computers to perform operations comprising:

receiving a network input; and generating a network output from the network input, wherein the network output comprises a plurality of outputs from a vocabulary of outputs arranged according to an output order, the generating comprising, at each of a plurality of generation time steps:

identifying a current partial network output that has already been generated as of the generation time step, the current partial network output comprising zero or more outputs from the vocabulary of outputs arranged according to a partial output order;

generating, using a decoder neural network conditioned on (i) at least a portion of the network input and (ii) any outputs in the current partial network output, a decoder output that defines, for each of a plurality of insertion locations, a respective score distribution over the vocabulary of outputs, wherein each insertion location is a different new location in the partial output order at which there is no output in the current partial network output, wherein the decoder neural network is an attention-based neural network that is configured to generate the decoder output by applying an attention mechanism over an encoded representation of the network input and a self-attention mechanism over the outputs in the current partial network output;

selecting, using the decoder output, one or more of the insertion locations and, for each selected insertion location, an inserted output from the vocabulary; and generating a new partial network output that comprises (i) the zero or more outputs in the current partial network output and (ii) for each selected insertion location, the inserted output from the vocabulary inserted at the corresponding new location in the partial output order.

14. The system of claim 13, wherein generating the decoder output using the decoder neural network comprises:

generating a decoder input that includes the encoded representation of the network input and the outputs in the current partial network output arranged according to the partial output order.

15. The system of claim 14, wherein generating the decoder input further comprises adding two marker outputs to the current partial network output, wherein the decoder neural network is configured to generate a respective representation vector for each location in the partial output order after the two marker outputs have been added, and wherein generating the decoder output comprises:

generating a respective slot representation for each insertion location by concatenating the representation vectors for each adjacent pair of locations in the partial output order; and generating a score distribution for each insertion location from at least the slot representation for the insertion location.

16. The system of claim 14, wherein the vocabulary includes an end-of-sequence token.

17. The system of claim 16, wherein selecting, using the decoder output, one or more of the insertion locations and, for each selected insertion location, an inserted output from the vocabulary comprises:

determining that an insertion location-output combination with a highest score across all insertion location-output combinations does not include the end-of-sequence token; and in response, selecting only the insertion location-output combination with a highest score across all insertion location-output combinations.

18. The system of claim 16, wherein selecting, using the decoder output, one or more of the insertion locations and, for each selected insertion location, an inserted output from the vocabulary comprises:

determining that there is at least one insertion location for which the output with the highest score is not the end-of-sequence token; and in response, selecting only an insertion location-output combination with a highest score across all insertion location-output combinations that include an insertion location for which the output with the highest score is not the end-of-sequence token.

19. The system of claim 16, wherein selecting, using the decoder output, one or more of the insertion locations and, for each selected insertion location, an inserted output from the vocabulary comprises:

identifying, from the decoder output and for each insertion location, an output that has a highest score for the insertion location;

determining that there is at least one insertion location for which the output with the highest score is not the end-of-sequence token; and in response, selecting each insertion location for which the output with the highest score is not the end-of-sequence token and the corresponding output that has the highest score for the insertion location.

20. The system of claim 16, wherein the decoder neural network is configured to generate a respective slot representation for each insertion location, and wherein generating the decoder output comprises:

projecting a decoder hidden state matrix generated from the slot representations using a projection matrix to generate a content-location logit matrix;

flattening the content-location logit matrix into a content-location logit vector; and applying a softmax over the content-location logit vector to generate a probability distribution over all insertion location-output combinations.

* * * * *